United States Patent
Sakamoto et al.

[11] Patent Number: 5,950,035
[45] Date of Patent: *Sep. 7, 1999

[54] DUAL DIAL APPARATUS

[75] Inventors: Takamasa Sakamoto, Osaka; Akihiro Oki, Sakai, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/932,425

[22] Filed: Sep. 17, 1997

Related U.S. Application Data

[63] Continuation of application No. 08/590,892, Jan. 24, 1996.

[30] Foreign Application Priority Data

Jan. 31, 1995 [JP] Japan ................................. 7-013315

[51] Int. Cl.$^6$ .................................................. G03B 17/00
[52] U.S. Cl. ........................... 396/543; 116/305; 396/299
[58] Field of Search .......................... 334/48, 3; 116/249, 116/250, 305, 318; 396/297, 299, 543; 200/274

[56] References Cited

U.S. PATENT DOCUMENTS

| | | |
|---|---|---|
| 3,956,763 | 5/1976 | Yamanaka ................. 354/289 |
| 4,089,014 | 5/1978 | Ueda et al. |
| 4,200,381 | 4/1980 | Ishizaka et al. ................. 354/289 |
| 4,853,726 | 8/1989 | Kawamura et al. |
| 5,283,606 | 2/1994 | Konno et al. ................. 354/289.1 |

FOREIGN PATENT DOCUMENTS

| | | |
|---|---|---|
| 52-70830 | 6/1977 | Japan. |
| 59-138833 | 9/1984 | Japan. |
| 62-14138 | 1/1987 | Japan. |

*Primary Examiner*—Russell Adams
*Assistant Examiner*—John Chizmar
*Attorney, Agent, or Firm*—Burns, Doane, Swecker & Mathis, L.L.P.

[57] ABSTRACT

First and second dials are coaxially and rotatably supported by a boss formed on an outer cover. An encoding plate having an encoding pattern formed on each of its upper and lower surfaces is fixed to the lower surface of the outer cover. A first contact which slides on one of the encoding patterns interlocking with the first dial is provided on the upper surface of a dial holding plate attached to a lower end of a shaft of the first dial. A second contact which slides on the other encoding pattern interlocking with the second dial is provided on the lower surface of a protrusion provided on the lower surface of the second dial.

26 Claims, 9 Drawing Sheets

DUAL DIAL APPARATUS

This application is a continuation of application Ser. No. 08/590,892, filed Jan. 24, 1996.

BACKGROUND OF THE INVENTION

1. Field of the Invention

The present invention relates to an apparatus having two dials.

2. Description of the Prior Art

Dual dials are used in various apparatuses for size reduction. For example, in a camera where it is typical to set various kinds of information prior to photographing, a dual dial is used as an information setting means. Referring to FIG. 1, there is shown a conventional dual dial used in a camera. A first dial knob 22, a first inner dial 30, a dial bearing 29, an encoding plate 25 and a dial holding plate 27 constitute a shutter speed changing mechanism. The first inner dial 30 with click holes 34 has its upper part housed in the first dial knob 22 and is fixed to the first dial knob 22 by a screw 50. A shaft 30a of the first inner dial 30 is inserted into a hole 29a of the dial bearing 29 to abut the upper surface of the dial holding plate 27. The dial holding plate 27 is attached by a screw 28 which is inserted from the lower surface of the plate 27. Consequently, when the first dial knob 22 is rotated, the dial holding plate 27 is also rotated, so that a dial contact 41 attached to the dial holding plate 27 slides on an encoding pattern (not shown) formed on the lower surface of the encoding plate 25, thereby changing the shutter speed of the camera.

Since a click ball 32 held in a hole 29b of the dial bearing 29 with a spring 51 therebetween so as to be partly exposed out of the hole 29b engages with the click holes 34 provided in the first inner dial 30, the first inner dial 30 is rotated with clicks when the first dial knob 22 is rotated. Each click position corresponds to a predetermined shutter speed.

A second dial knob 23, a second inner dial 31, an encoding plate 26 and a base plate 24 constitute a camera on/off mechanism. In this case, a protrusion 36 extending downward from the second dial knob 23 engages with a concave 36' formed at a periphery of the second inner dial 31. To the lower surface of the second inner dial 31, a second dial contact 42 is attached, and a hole (not shown) for holding a spring 52 and a click ball 33 therein is formed on the lower surface. The click ball 33 selectively engages with one of the click holes 35 of the base plate 24 through an arched cut 53 of the encoding plate 26. Consequently, when the second dial knob 23 is rotated, the second inner dial 31 is also rotated with clicks. At this time, the second dial contact 42 slides on an encoding pattern 44 formed on the encoding plate 26.

The base plate 24 is fixed to the camera body. The encoding plates 26 and 25 are arranged so that the plate 26 is above the plate 25 with the plate 24 therebetween. Reference numeral 21 represents an outer cover of the camera. The second dial knob 23, the outer cover 21, the second inner dial 31, the base plate 24 and the dial holding plate 27 each has a necessary hole in their centers as shown in the figure.

However, since the above-described conventional dual dial requires a large number of parts, the assembling efficiency is low and it is cumbersome to manage such a large number of parts. As a result, the cost increases.

SUMMARY OF THE INVENTION

An object of the present invention is to provide an apparatus having a dial of an excellent structure.

Another object of the present invention is to provide an apparatus having a dial capable of being structured with a minimum number of parts.

Still another object of the present invention is to provide an apparatus having a dial of a structure realized at a reduced manufacture cost.

To achieve the above-mentioned object, according to the present invention, an apparatus having a dial is provided with an outer cover of the apparatus, a first dial disposed to be exposed out of the apparatus through the outer cover for setting first information, a second dial disposed to be exposed out of the apparatus through the outer cover for setting second information, a base plate having a first conductive pattern used for setting the first information and a second conductive pattern used for setting the second information, a first contact member disposed to slide on the first conductive pattern, interlocking with the first dial, and a second contact member disposed to slide on the second conductive pattern, interlocking with the second dial. The outer cover coaxially supports the first and second dials to be rotatable and supports the base plate to be fixed inside the apparatus.

Further, according to the present invention, the first conductive pattern is formed on one surface of the base plate and the second conductive pattern is formed on another surface of the base plate.

According to such features, the first and second dials are rotatably supported by the outer cover of the apparatus, so that when the first dial is rotated, the first contact member slides on the first conductive pattern formed on one surface of the base plate, thereby setting the information allotted to the first dial. Likewise, when the second dial is rotated, the second contact member slides on the second conductive pattern formed on another surface of the base plate, thereby setting the information allotted to the second dial.

Further, according to the present invention, since the base plate is formed to have the first conductive pattern on its one surface and the second conductive pattern on its another surface, the first contact member slides on one surface and the second contact member slides on another surface, so that different kinds of information can be set with one base plate.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
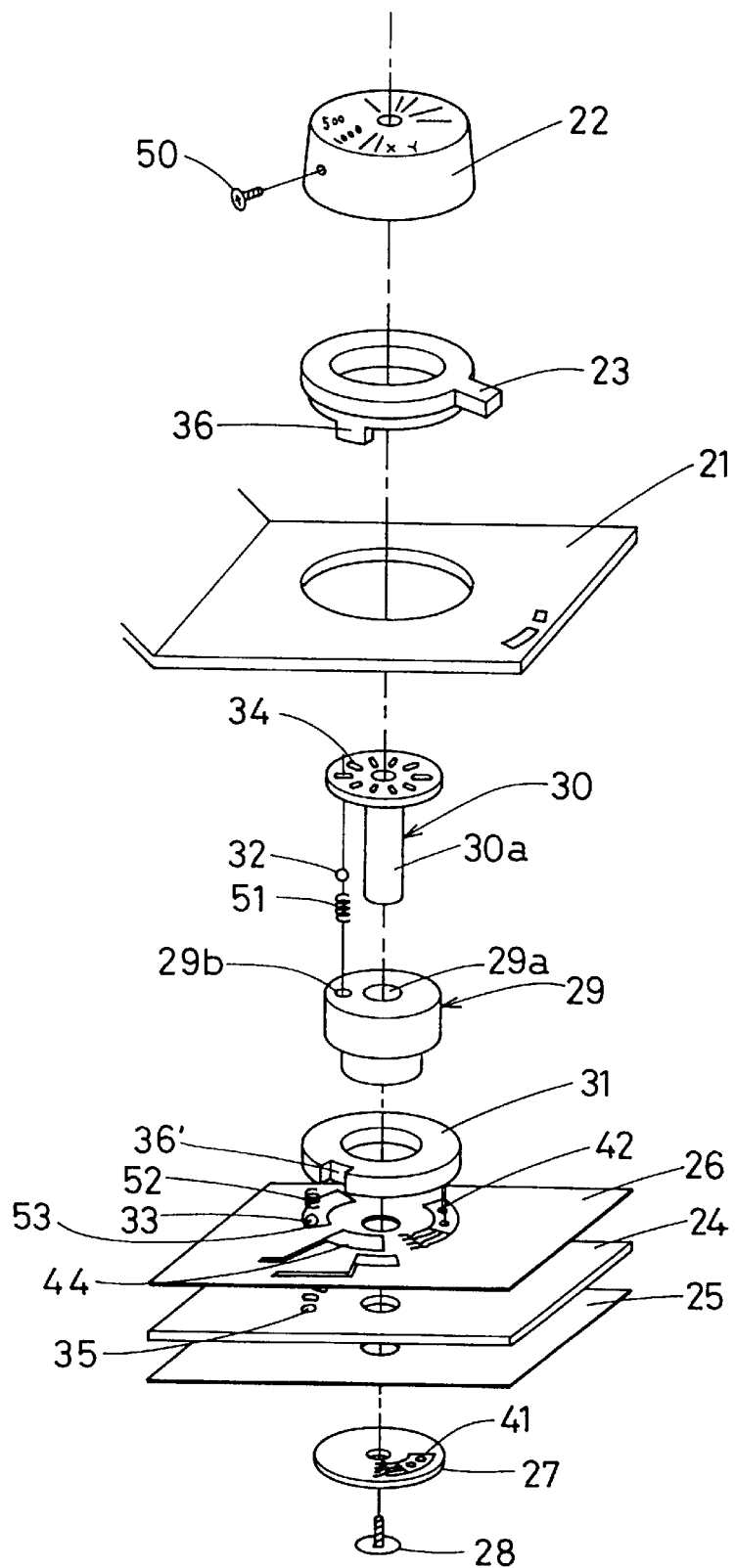
FIG. 1 is an exploded perspective view of a conventional dual dial.
Figure 2:
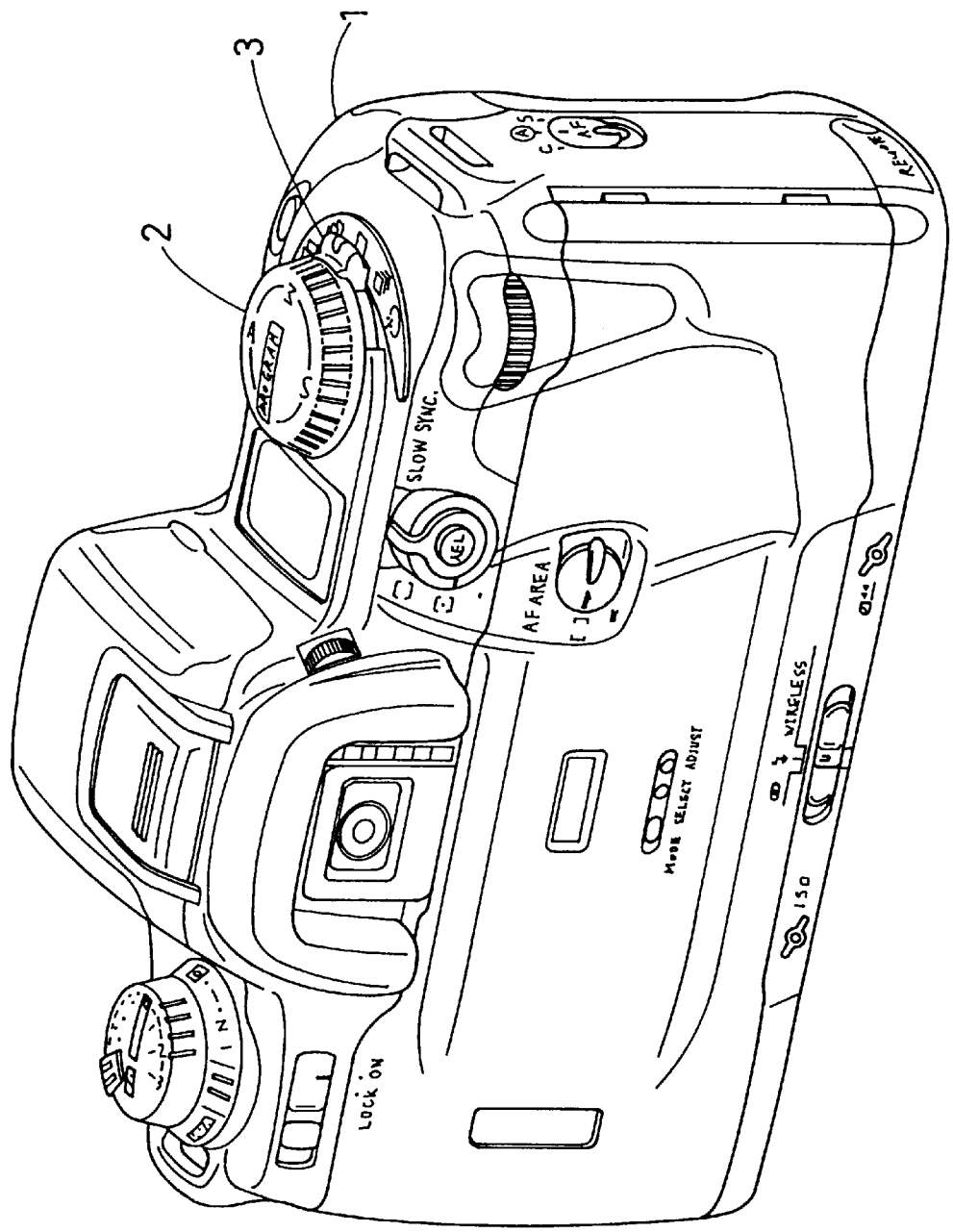
FIG. 2 shows the appearance of a camera according to a first embodiment of the present invention.

Hereinafter, embodiments in which the present invention is employed for a camera having a dual dial will be described with reference to the drawings. FIGS. 2 to 5 show a first embodiment of the present invention. Referring to FIG. 2, there is shown the appearance of a camera having a dual dial. The dual dial provided with a first dial 2 and a second dial 3 is compactly arranged with an outer cover 1 inbetween.

Figure 3:
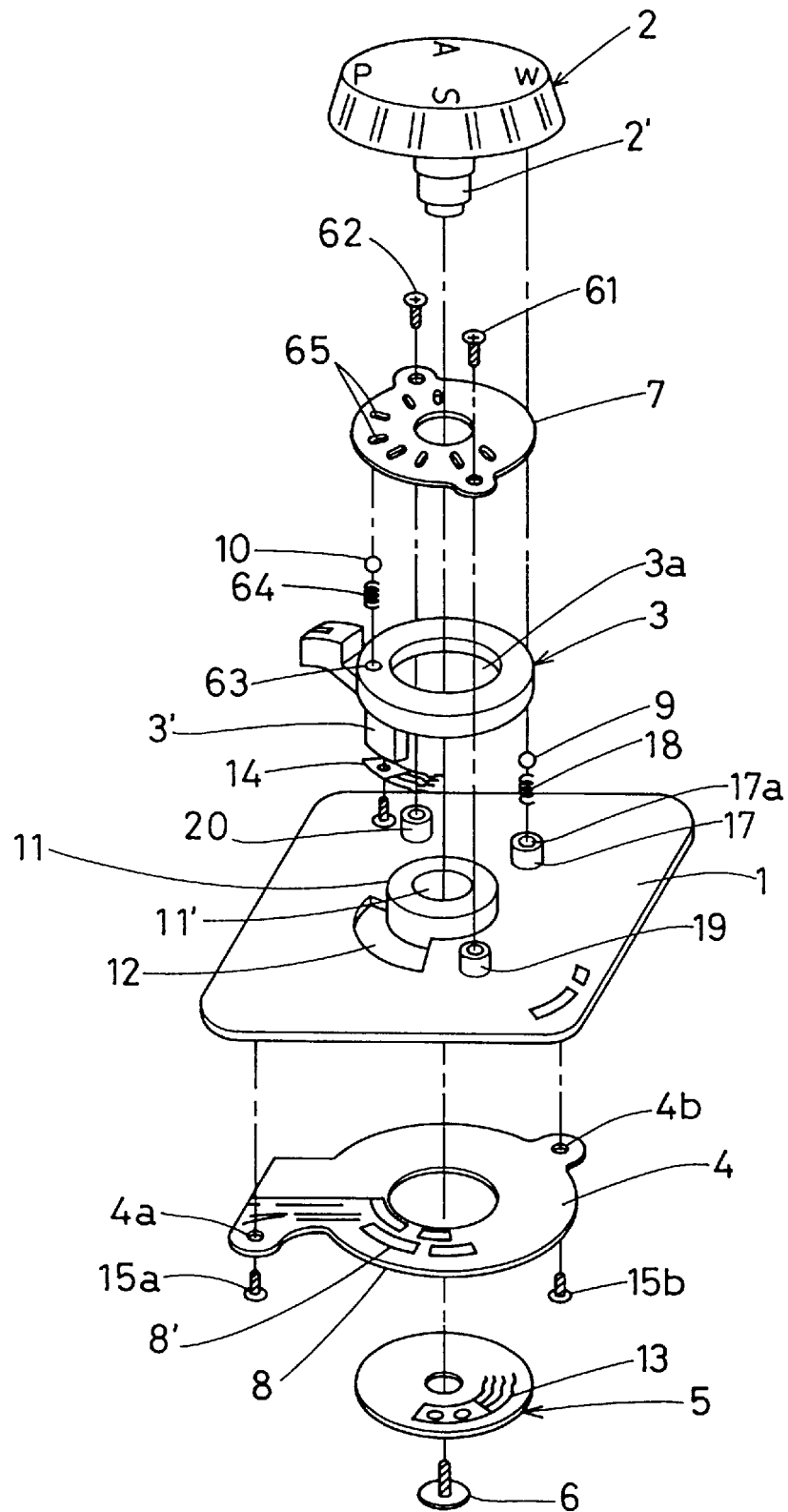
FIG. 3 is an exploded perspective view of the camera according to the first embodiment.
Figure 4:
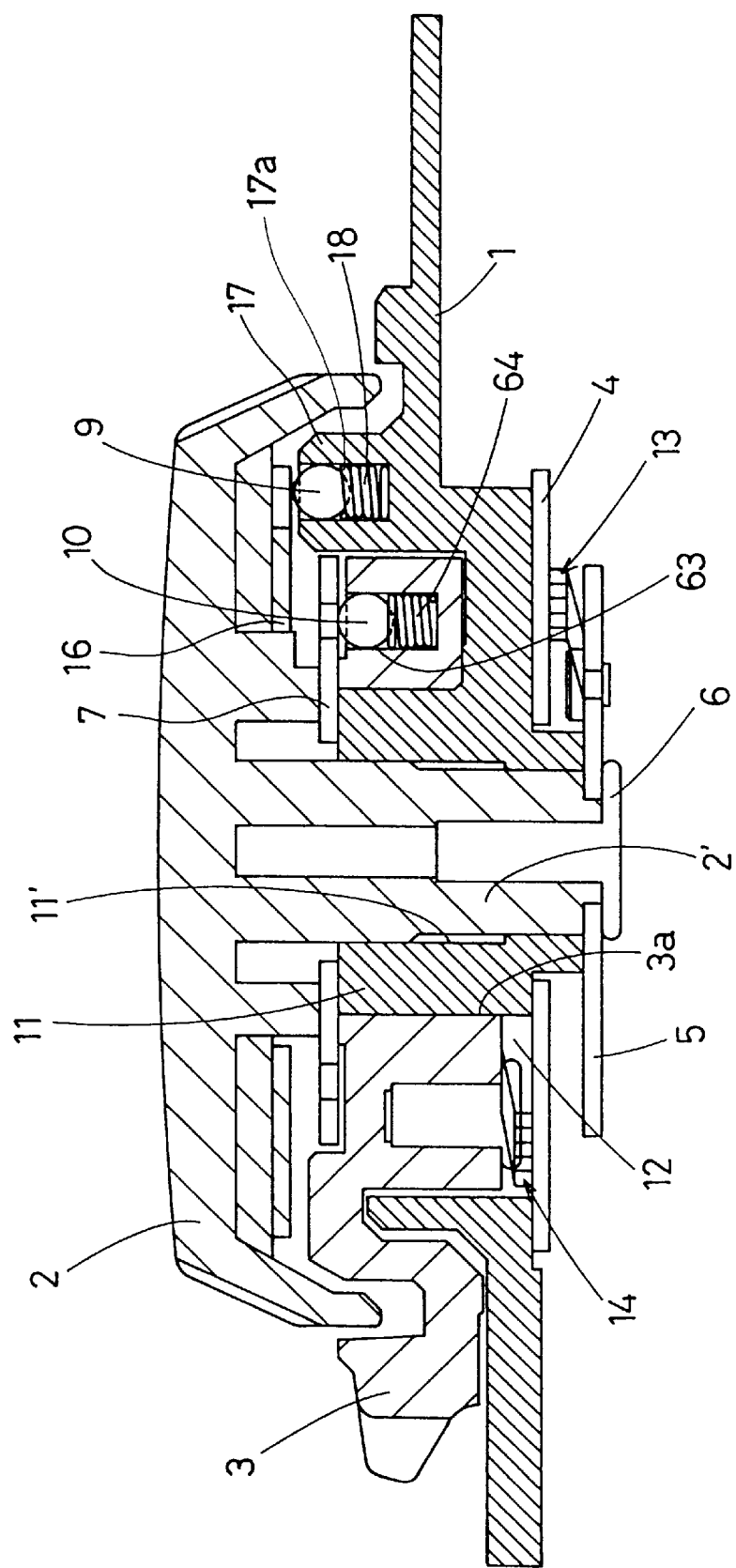
FIG. 4 is a longitudinal cross-sectional view of the camera according to the first embodiment.

FIG. 3 is an exploded perspective view showing the structure of the dual dial. FIG. 4 is a cross-sectional view showing the assembled condition of the dual dial. The outer cover 1 is provided with a boss 11 having a through hole 11'. A shaft 2' of the first dial 2 rotatably engages with the through hole 11'. The boss 11 is inserted into a hole 3a formed in the second dial 3, so that the second dial 3 is rotatable around the boss 11.

To the lower surface of the outer cover 1, an encoding plate 4 having encoding patterns 8 and 8' formed on its lower and upper surfaces, respectively, is fixed by screws 15a and 15b. Holes 4a and 4b are provided for the screwing. The shaft 2' of the first dial 2 is inserted through the outer cover 1 and the encoding plate 4. To the lower end of the shaft 2', a dial holding plate 5 is attached by a screw 6. To the upper surface of the dial holding plate 5, a first dial contact 13 is attached. When the first dial 2 is rotated, the first dial contact 13 slides on the encoding pattern 8 formed on the lower surface of the encoding plate 4. A protrusion 3' formed on the lower surface of the second dial 3 is inserted through a through hole 12 in the vicinity of the boss 11 to reach below the outer cover 1. To the lower surface of the protrusion 3', a second dial contact 14 is attached. When the second dial 3 is rotated, the second dial contact 14 slides on the encoding pattern 8' formed on the upper surface of the encoding plate 4.

Figure 5:
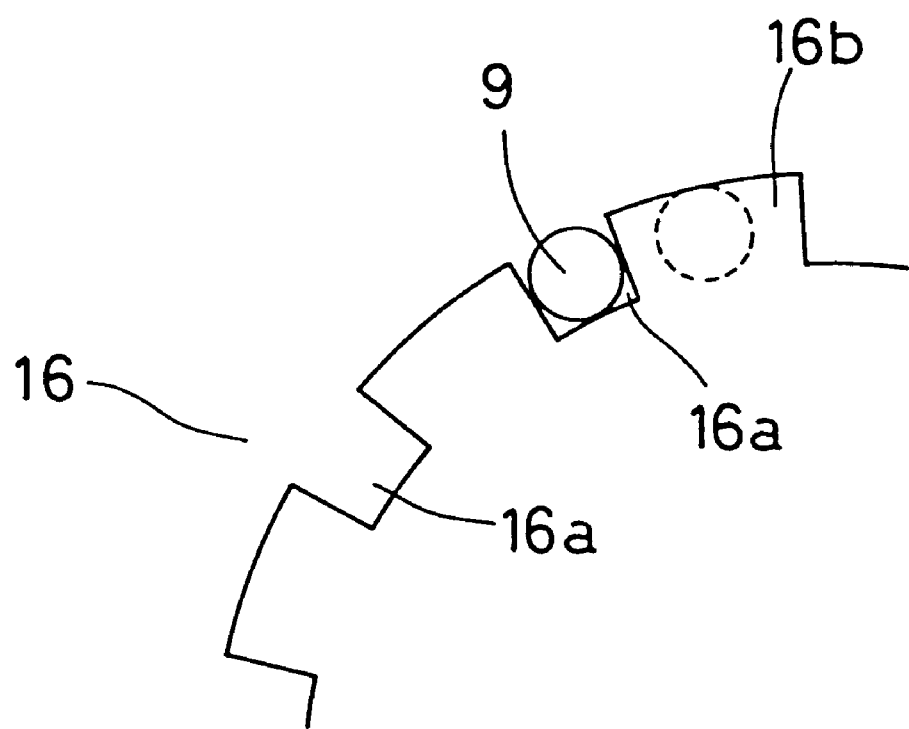
FIG. 5 shows an uneven member used in a click mechanism for a first dial of the camera of the first embodiment.

A click mechanism is provided for each of the first and second dials to hold their rotating positions. Specifically, as shown in FIG. 5, an uneven member 16 is provided inside the first dial 2. As the first dial 2 is rotated, a click ball 9 is located alternately in a concave 16a and on a convex 16b, whereby the first dial 2 is rotated with clicks. Needless to say, the click ball 9 is located in the concave 16a when the rotation of the dial 2 is stopped.

The click ball 9 is held, as shown in FIG. 4, in a hole 17a of a boss 17 of the outer cover 1 with a spring 18 therebetween. Further describing, the first dial 2 restrains the click ball 9 from being pushed out of the hole 17a of the boss 17 by the spring 18. The click ball 9 is reciprocated upward and downward by the concaves 16a and the convexes 16b.

With respect to the click mechanism for the second dial 3, a dial click plate 7 is fixed to bosses 19 and 20 of the outer cover 1 by screws 61 and 62. The dial click plate 7 is located above the second dial 3. The second dial 3 is provided with a hole 63 in which a spring 64 and a click ball 10 are held. At this time, the dial click plate 7 pushes down the click ball 10. The dial click plate 7 is provided with circumferentially spaced click holes 65.

When the first and second dials 2 and 3 are rotated, first and second information is changed or set. For example, the first dial 2 may be used to set an exposure mode, i.e. one of a program mode (P), an aperture priority mode (A), a shutter speed priority mode (S) and a manual mode (M), and the second dial 3 may be used to set one of one-shot photographing, continuous photographing, self-timer photographing and multiple exposure photographing.

Figure 6:
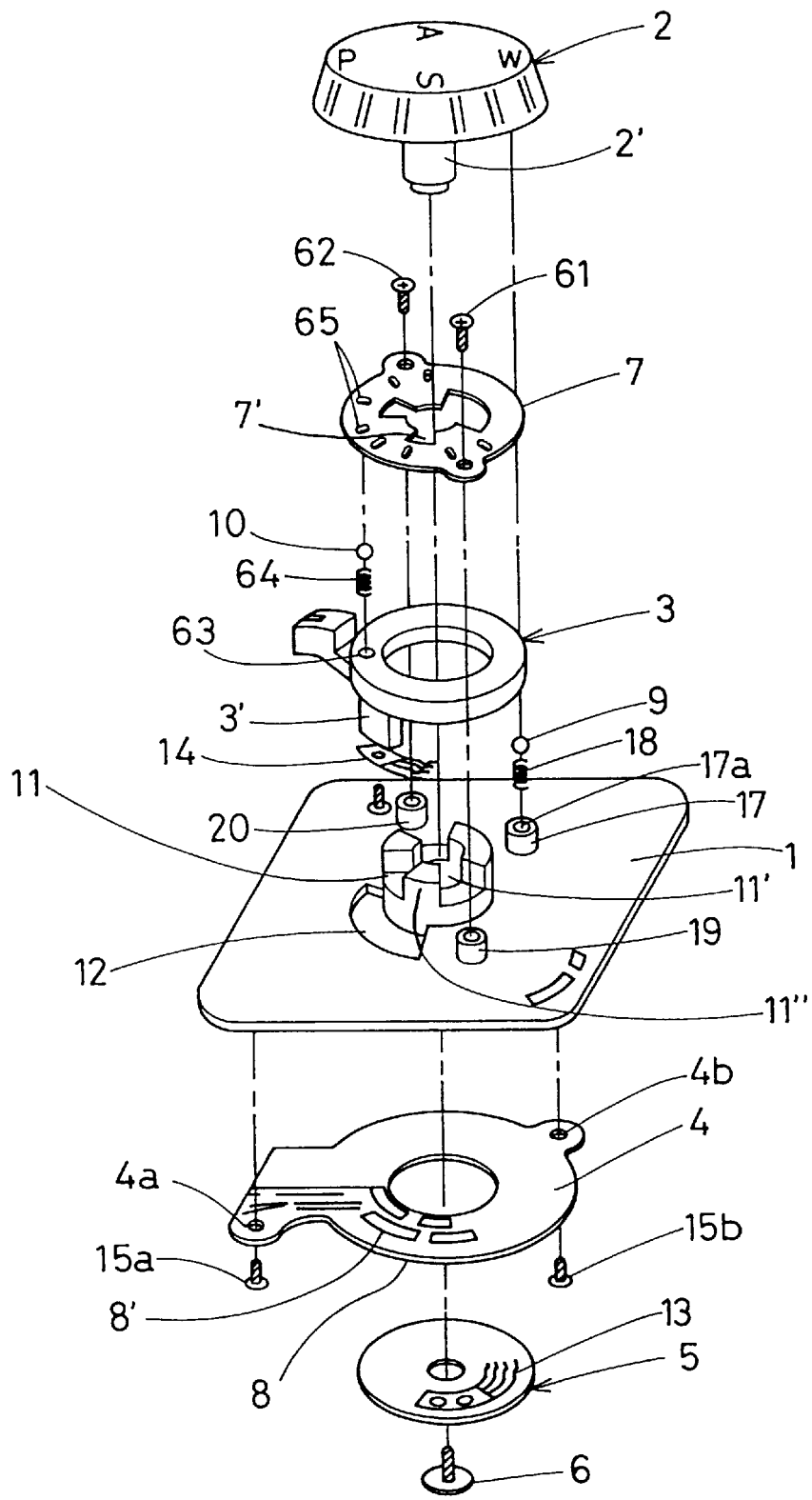
FIG. 6 is an exploded perspective view of a camera according to a second embodiment of the present invention.
Figure 7:
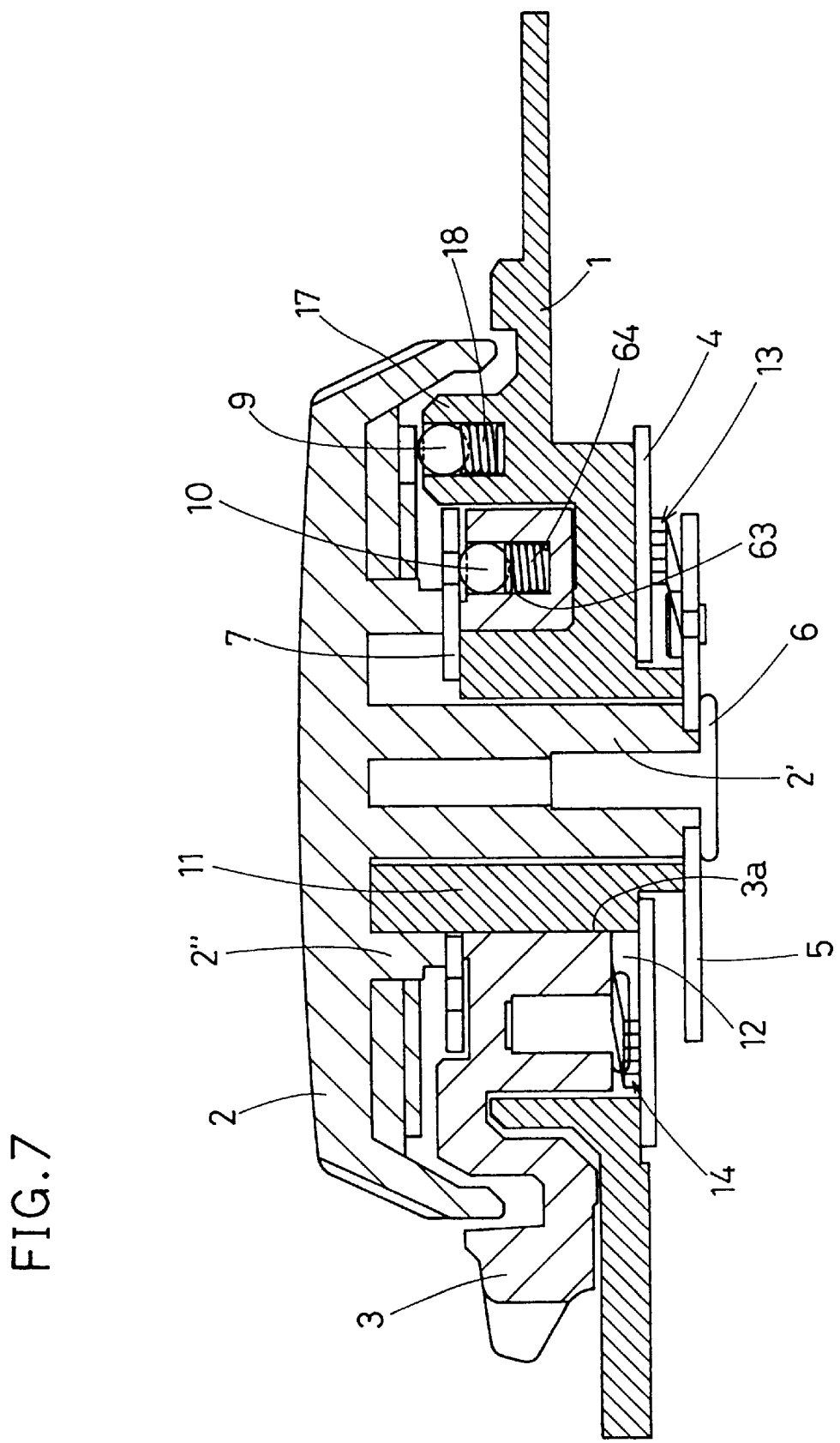
FIG. 7 is a longitudinal cross-sectional view of the camera according to the second embodiment.

FIGS. 6 and 7 show a second embodiment of the present invention. The appearance of the camera according to this embodiment is the same as that of the first embodiment shown in FIG. 2. FIG. 6 is an exploded perspective view showing the structure of a dual dial. FIG. 7 is a cross-sectional view showing the assembled condition of the dual dial. The same parts as those of the first embodiment are identified by the same reference designations. This embodiment is different from the first embodiment in that the first dial 2 is also supported by the outside diameter of the boss 11. For this reason, a part of the boss 11 extends farther upward than in the first embodiment and an upwardly extending portion 11" engages with a bearing 2" formed at a lower inside of the first dial 2. The dial click plate 7 has a cut 7' for inserting the upwardly extending portion 11" of the boss 11 therethrough. The other parts are the same as those of the first embodiment.

In the second embodiment, the inside diameter of the boss 11 and the outside diameter of the shaft 2' of the first dial 2 do not require high precision. Since the upwardly extending portion 11" of the boss 11 restrains the rotation of the dial click plate 7, the strength of screwing of the dial click plate 7 may be low. The boss may be formed so that the entire upper surface thereof extends upward.

Figure 8:
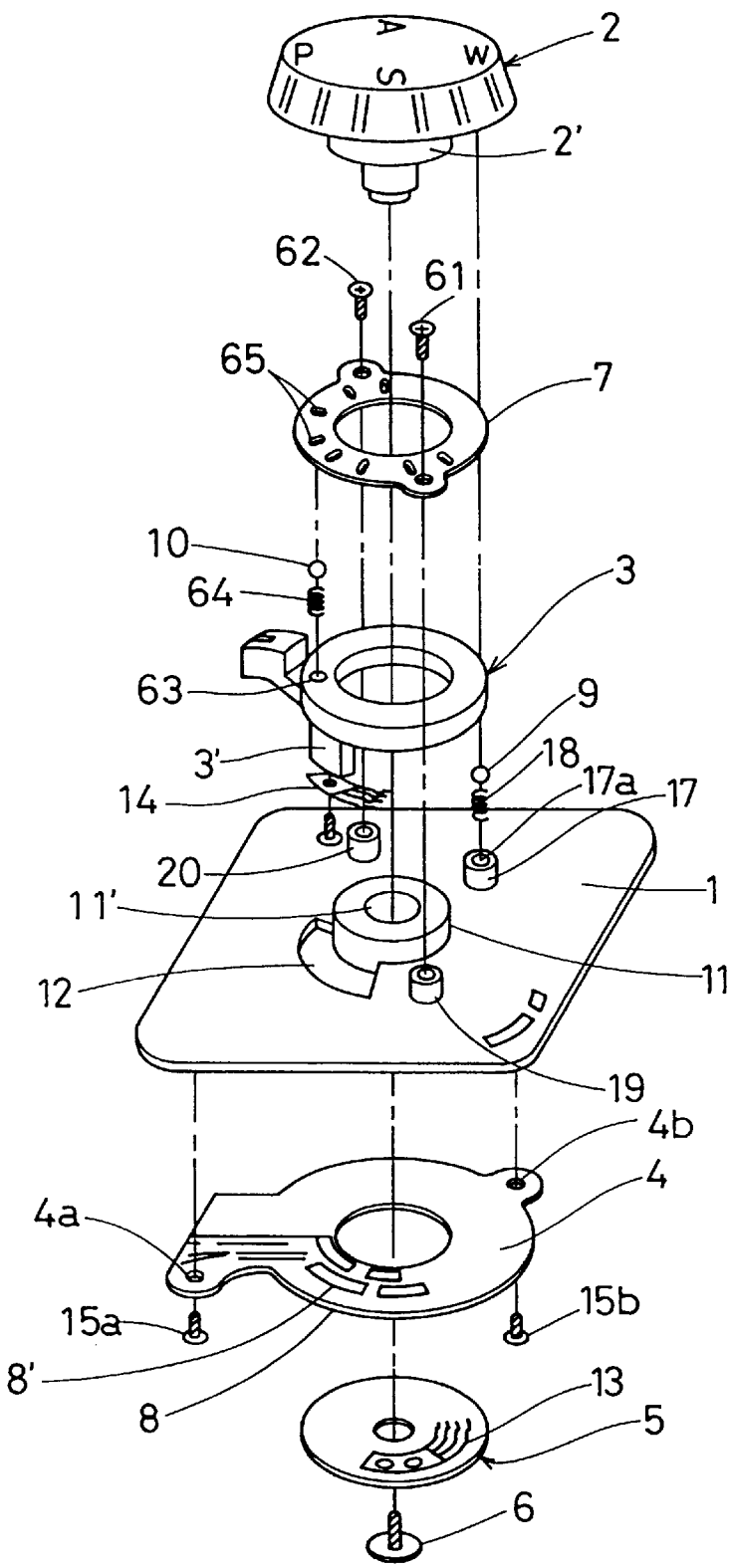
FIG. 8 is an exploded perspective view of the camera according to a third embodiment of the present invention.
Figure 9:
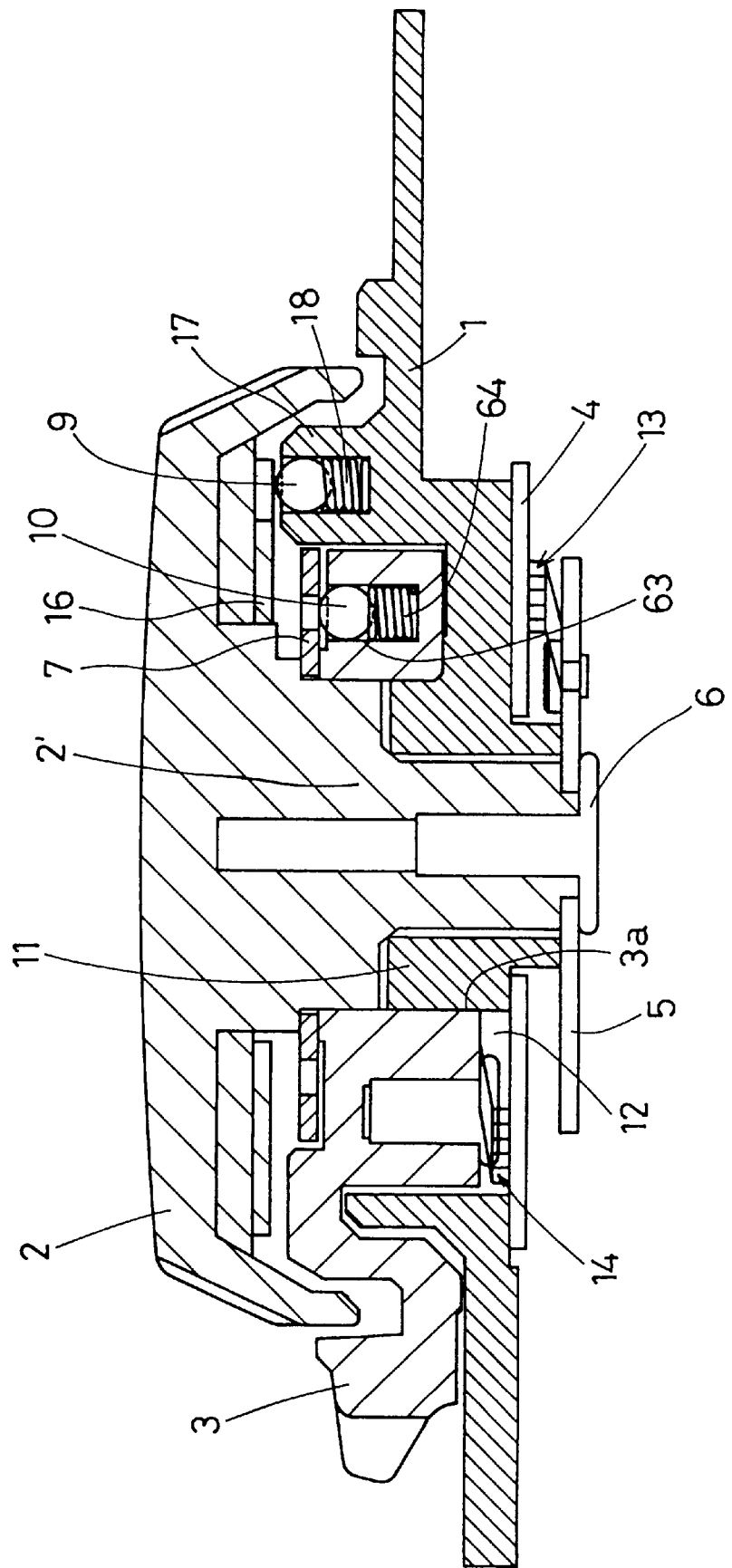
FIG. 9 is a longitudinal cross-sectional view according to the third embodiment.

FIGS. 8 and 9 show a third embodiment of the present invention. The appearance of the camera according to this embodiment is the same as that of the first embodiment shown in FIG. 2. FIG. 8 is an exploded perspective view showing the structure of a dual dial. FIG. 9 is a cross-sectional view showing the assembled condition of the dual dial. The same parts as those of the first and second embodiments are identified by the same reference designations. This embodiment is different from the second embodiment in that the first dial 2 is supported by the inside diameter of the second dial 3. For this reason, the shaft 2' of the first dial 2 is formed to be slightly thick and engages with the inside diameter of the second dial 3. The other parts are the same as those of the first and second embodiments. In the third embodiment, the inside diameter of the boss 11 does not require high precision like in the second embodiment.

While in the first to third embodiments, the encoding plate 4 is used having on its lower and upper surfaces the first and second encoding patterns 8 and 8' on which the first and second contacts 13 and 14 slide, the first and second encoding patterns 8 and 8' may be formed on one surface. For example, the first encoding pattern is formed along an inner circumference on the upper surface of the encoding plate 4, the second encoding pattern is formed outside the first encoding pattern, and the first contact 13 which slides on the first encoding pattern 8 provided along the inner circumference on the upper surface of the encoding plate 4 is provided at a lower end of the shaft 2' of the first dial 2. Then, a dual dial having the same function as those of the first to third embodiments is obtained without increasing the number of parts even though the second dial 3, the boss 11 provided on the outer cover 1 and the click mechanisms are the same as those of the first to third embodiments.

While the present invention is employed for a camera in the above-described embodiments, the apparatus of the present invention is not limited to cameras. The present invention is employable not only for cameras but also for various other apparatuses, for example, apparatuses such as radios and transceivers which receive and transmit radio waves and audio apparatuses such as cassette recorders/players.

Obviously, many modifications and variations of the present invention are possible in light of the above teachings. It is therefore to be understood that within the scope of the appended claims, the invention may be practiced other than as specifically described.

What is claimed is:

1. An apparatus having a dial, comprising:

an outer cover of the apparatus which is visible from outside of the apparatus and which forms an appearance of the apparatus;

a first dial disposed to be exposed out of the apparatus through the outer cover for setting first information;

a second dial disposed to be exposed out of the apparatus through the outer cover for setting second information;

a base plate having a first conductive pattern used for setting the first information and a second conductive pattern used for setting the second information;

a first contact member disposed to slide on the first conductive pattern, interlocking with the first dial; and a second contact member disposed to slide on the second conductive pattern, interlocking with the second dial;

wherein a top surface of the outer cover includes a one-piece, unitary section that coaxially supports both the first and second dials and the base plate to determine their respective positions on and inside the apparatus.

2. An apparatus as claimed in claim 1, wherein the first conductive pattern is formed on one surface of the base plate and the second conductive pattern is formed on another surface of the base plate.

3. An apparatus as claimed in claim 1, wherein the outer cover has a boss for supporting the first and second dials.

4. An apparatus as claimed in claim 3, wherein the second dial has a protrusion at a position other than its axis of rotation, and wherein the outer cover has an opening for admitting the protrusion into the apparatus therethrough.

5. An apparatus as claimed in claim 3, wherein the first dial is supported by an inner circumference of the boss and the second dial is supported by an outer circumference of the boss.

6. An apparatus as claimed in claim 3, wherein the first and second dials are both supported by an outer circumference of the boss.

7. An apparatus as claimed in claim 3, wherein the first dial is supported by the second dial.

8. An apparatus having a dial, comprising:

a first dial which rotates;

a second dial which rotates;

a first kind of conductive pattern for setting first information by a rotation of the first dial;

a second kind of conductive pattern for setting second information by a rotation of the second dial; and an outer cover of the apparatus disposed outside the apparatus for forming an appearance of the apparatus, the outer cover including a one-niece unitary section having a top surface for supporting both of the first and second dials to determine their respective positions.

9. An apparatus as claimed in claim 8, wherein a base plate is provided which has the first kind of conductive pattern on one surface and the second kind of conductive pattern on another surface.

10. An apparatus as claimed in claim 8, wherein the outer cover has a boss for supporting the first and second dials.

11. An apparatus as claimed in claim 10, wherein the second dial has a protrusion at a position other than its axis of rotation, and wherein the outer cover has an opening for admitting the protrusion into the apparatus therethrough.

12. An apparatus as claimed in claim 10, wherein the first dial is supported by an inner circumference of the boss and the second dial is supported by an outer circumference of the boss.

13. An apparatus as claimed in claim 10, wherein the first and second dials are both supported by an outer circumference of the boss.

14. An apparatus as claimed in claim 10, wherein the first dial is supported by the second dial.

15. An apparatus having a dial, comprising:

an outer cover of the apparatus;

a first dial disposed to be exposed out of the apparatus through the outer cover for setting first information;

a second dial disposed to be exposed out of the apparatus through the outer cover for setting second information;

a base plate having a first conductive pattern used for setting the first information and a second conductive pattern used for setting the second information;

a first contact member disposed to slide on the first conductive pattern, interlocking with the first dial; and a second contact member disposed to slide on the second conductive pattern, interlocking with the second dial;

wherein the outer cover coaxially supports the first and second dials to be rotatable and supports the base plate to be fixed inside the apparatus; and wherein the first conductive pattern is formed on one surface of the base plate and the second conductive pattern is formed on another surface of the base plate.

16. An apparatus having a dial, comprising:

an outer cover of the apparatus;

a first dial disposed to be exposed out of the apparatus through the outer cover for setting first information;

a second dial disposed to be exposed out of the apparatus through the outer cover for setting second information;

a base plate having a first conductive pattern used for setting the first information and a second conductive pattern used for setting the second information;

a first contact member disposed to slide on the first conductive pattern, interlocking with the first dial; and a second contact member disposed to slide on the second conductive pattern, interlocking with the second dial;

wherein the outer cover has a one-piece, unitary section that includes a top surface that coaxially supports the first and second dials to be rotatable and supports the base plate to be fixed inside the apparatus; and wherein the outer cover has a boss for supporting the first and second dials.

17. An apparatus as claimed in claim 16, wherein the second dial has a protrusion at a position other than its axis of rotation, and wherein the outer cover has an opening for admitting the protrusion into the apparatus therethrough.

18. An apparatus as claimed in claim 16, wherein the first dial is supported by an inner circumference of the boss and the second dial is supported by an outer circumference of the boss.

19. An apparatus as claimed in claim 16, wherein the first and second dials are both supported by an outer circumference of the boss.

20. An apparatus as claimed in claim 16, wherein the first dial is supported by the second dial.

21. An apparatus having a dial, comprising:

a first dial which rotates;

a second dial which rotates;

a first kind of conductive pattern for setting first information by a rotation of the first dial;

a second kind of conductive pattern for setting second information by a rotation of the second dial;

an outer cover of the apparatus disposed outside the apparatus for supporting the first and second dials to be rotatable; and a base plate which has the first kind of conductive pattern on one surface and the second kind of conductive pattern on another surface.

22. An apparatus having a dial, comprising:

a first dial which rotates;

a second dial which rotates;

a first kind of conductive pattern for setting first information by a rotation of the first dial;

a second kind of conductive pattern for setting second information by a rotation of the second dial;

an outer cover of the apparatus has a one-piece, unitary section that includes a top surface that is disposed outside the apparatus for supporting the first and second dials to be rotatable; and wherein the outer cover has a boss for supporting the first and second dials.

23. An apparatus as claimed in claim 22, wherein the second dial has a protrusion at a position other than its axis of rotation, and wherein the outer cover has an opening for admitting the protrusion into the apparatus therethrough.

24. An apparatus as claimed 22, wherein the first dial is supported by an inner circumference of the boss and the second dial is supported by an outer circumference of the boss.

25. An apparatus as claimed in claim 22, wherein the first and second dials are both supported by an outer circumference of the boss.

26. An apparatus as claimed in claim 22, wherein the first dial is supported by the second dial.

* * * * *